(12) United States Patent
Bayliss et al.

(10) Patent No.: US 8,950,703 B2
(45) Date of Patent: Feb. 10, 2015

(54) INDEPENDENT POWER GENERATION IN AIRCRAFT

(71) Applicant: The Boeing Company, Chicago, IL (US)

(72) Inventors: Andrew J. Bayliss, Tulalip, WA (US); John T. Paterson, Mulkilteo, WA (US); Kevin Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 14/056,568

(22) Filed: Oct. 17, 2013

(65) Prior Publication Data

US 2015/0014479 A1    Jan. 15, 2015

Related U.S. Application Data

(62) Division of application No. 12/558,177, filed on Sep. 11, 2009.

(51) Int. Cl.
*B64D 41/00* (2006.01)

(52) U.S. Cl.
USPC .............................. 244/58; 244/134 D; 290/7

(58) Field of Classification Search
USPC ............... 244/58, 134 D, 175, 236, 227, 228; 290/7; 310/10; 417/313
See application file for complete search history.

(56) References Cited

U.S. PATENT DOCUMENTS

| | | | |
|---|---|---|---|
| 2,016,253 A | 10/1935 | Noblitt et al. | |
| 2,512,155 A | 6/1950 | Hill | |
| 2,777,301 A | 1/1957 | Kuhn | |
| 2,953,325 A | 9/1960 | Hadekel | |
| 2,960,825 A | 11/1960 | Sampietro et al. | |
| 2,988,302 A | 6/1961 | Smith | |
| 3,033,307 A | 5/1962 | Sanders et al. | |
| 3,057,170 A | 10/1962 | Brahm | |
| 3,057,583 A | 10/1962 | Majendie et al. | |
| 3,060,684 A | 10/1962 | Holmes | |
| 3,105,631 A | 10/1963 | Hanny | |
| 3,177,679 A | 4/1965 | Quick et al. | |
| 3,194,026 A | 7/1965 | La Fleur | |

(Continued)

FOREIGN PATENT DOCUMENTS

| CA | 2261730 C | 2/1998 |
|---|---|---|
| DE | 69712210 T2 | 10/2002 |

(Continued)

OTHER PUBLICATIONS

"Aeronautical Engineering; Construction of the Shetland", The Aeroplane Magazine, Dec. 7, 1945, pp. 661-667.

(Continued)

*Primary Examiner* — Christopher P Ellis
*Assistant Examiner* — Medhat Badawi
(74) *Attorney, Agent, or Firm* — Toler Law Group, PC

(57) ABSTRACT

A method includes generating thrust at one or more engines of an aircraft. The method includes generating first electricity at a first power unit concurrently with generating second electricity at a second power unit. The first power unit and the second power unit are independent of the one or more engines of the aircraft. The first electricity has a first set of electrical characteristics and the second electricity has a second set of electrical characteristics, where the first set of electrical characteristics is different than the second set of electrical characteristics.

20 Claims, 4 Drawing Sheets

(56) References Cited

U.S. PATENT DOCUMENTS

| | | | |
|---|---|---|---|
| 3,321,930 A | 5/1967 | La Fleur | |
| 3,353,626 A | 11/1967 | Cremer et al. | |
| 3,382,671 A | 5/1968 | Ehni, III | |
| 3,437,173 A | 4/1969 | Ehrich | |
| 3,439,774 A | 4/1969 | Callaway et al. | |
| 3,519,843 A | 7/1970 | Trautman | |
| 3,648,803 A | 3/1972 | Heath et al. | |
| 3,680,660 A | 8/1972 | DuBois | |
| 3,683,749 A | 8/1972 | Bayles | |
| 3,764,815 A | 10/1973 | Habock et al. | |
| 3,913,702 A | 10/1975 | Wirt et al. | |
| 3,920,095 A | 11/1975 | Clark | |
| 4,001,892 A | 1/1977 | Castelli et al. | |
| 4,064,961 A | 12/1977 | Tseo | |
| 4,091,613 A * | 5/1978 | Young | 60/785 |
| 4,091,892 A | 5/1978 | Hehmann et al. | |
| 4,137,992 A | 2/1979 | Herman | |
| 4,226,297 A | 10/1980 | Cicon | |
| 4,244,441 A | 1/1981 | Tolman | |
| 4,312,191 A | 1/1982 | Biagini | |
| 4,314,621 A | 2/1982 | Hansen | |
| 4,359,136 A | 11/1982 | Eriksson | |
| 4,360,075 A | 11/1982 | Blaser et al. | |
| 4,370,560 A | 1/1983 | Faulkner et al. | |
| 4,371,053 A | 2/1983 | Jones | |
| 4,418,879 A | 12/1983 | Vanderleest | |
| 4,419,926 A | 12/1983 | Cronin et al. | |
| 4,426,911 A | 1/1984 | Robinson et al. | |
| 4,434,624 A | 3/1984 | Cronin et al. | |
| 4,456,830 A | 6/1984 | Cronin | |
| 4,462,561 A | 7/1984 | Cronin | |
| 4,494,372 A | 1/1985 | Cronin | |
| 4,503,666 A | 3/1985 | Christoff | |
| 4,514,976 A | 5/1985 | Christoff | |
| 4,523,517 A * | 6/1985 | Cronin | 454/74 |
| 4,533,097 A | 8/1985 | Aldrich | |
| 4,546,939 A | 10/1985 | Cronin | |
| 4,645,032 A | 2/1987 | Ross et al. | |
| 4,684,081 A | 8/1987 | Cronin | |
| 4,694,654 A | 9/1987 | Kawamura | |
| 4,706,908 A | 11/1987 | Huffman et al. | |
| 4,742,760 A | 5/1988 | Horstman et al. | |
| 4,744,440 A | 5/1988 | Hanson | |
| 4,759,515 A | 7/1988 | Carl | |
| 4,762,294 A | 8/1988 | Carl | |
| 4,910,414 A | 3/1990 | Krebs | |
| 4,979,587 A | 12/1990 | Hirt et al. | |
| 5,074,495 A | 12/1991 | Raymond | |
| 5,145,124 A | 9/1992 | Brunskill et al. | |
| 5,152,141 A | 10/1992 | Rumford et al. | |
| 5,162,620 A | 11/1992 | Ross et al. | |
| 5,217,187 A | 6/1993 | Criswell | |
| 5,268,541 A | 12/1993 | Pettersson | |
| 5,299,763 A | 4/1994 | Bescoby et al. | |
| 5,309,029 A * | 5/1994 | Gregory et al. | 290/1 R |
| 5,323,603 A | 6/1994 | Malohn | |
| 5,365,025 A | 11/1994 | Kraai et al. | |
| 5,490,645 A * | 2/1996 | Woodhouse | 244/118.5 |
| 5,535,601 A | 7/1996 | Teraoka | |
| 5,627,744 A | 5/1997 | Baker et al. | |
| 5,655,359 A | 8/1997 | Campbell et al. | |
| 5,695,396 A | 12/1997 | Markwart et al. | |
| 5,709,103 A | 1/1998 | Williams | |
| 5,734,239 A | 3/1998 | Turner | |
| 5,735,116 A | 4/1998 | Mouton | |
| 5,791,982 A | 8/1998 | Curry et al. | |
| 5,813,630 A | 9/1998 | Williams | |
| 5,865,602 A | 2/1999 | Nozari | |
| 5,899,085 A | 5/1999 | Williams | |
| 5,899,411 A * | 5/1999 | Latos et al. | 244/53 A |
| 5,902,970 A | 5/1999 | Ferri | |
| 5,967,461 A | 10/1999 | Farrington | |
| 5,977,645 A | 11/1999 | Glennon | |
| 6,018,233 A | 1/2000 | Glennon | |
| 6,039,287 A | 3/2000 | Liston et al. | |
| 6,092,360 A | 7/2000 | Hoag et al. | |
| 6,142,418 A * | 11/2000 | Weber et al. | 244/58 |
| 6,158,546 A | 12/2000 | Hanson et al. | |
| 6,241,182 B1 | 6/2001 | Durandeau et al. | |
| 6,244,539 B1 | 6/2001 | Liston et al. | |
| 6,264,137 B1 | 7/2001 | Sheoran | |
| 6,272,838 B1 | 8/2001 | Harvell et al. | |
| 6,296,957 B1 * | 10/2001 | Graage | 429/425 |
| 6,308,915 B1 | 10/2001 | Liston et al. | |
| 6,344,700 B1 | 2/2002 | Eisenhauer et al. | |
| 6,360,844 B2 | 3/2002 | Hogeboom et al. | |
| 6,467,725 B1 | 10/2002 | Coles et al. | |
| 6,491,254 B1 | 12/2002 | Walkinshaw et al. | |
| 6,508,219 B2 | 1/2003 | Schorn | |
| 6,526,775 B1 | 3/2003 | Asfia et al. | |
| 6,615,576 B2 | 9/2003 | Sheoran et al. | |
| 6,651,929 B2 | 11/2003 | Dionne | |
| 6,664,656 B2 | 12/2003 | Bernier | |
| 6,681,592 B1 | 1/2004 | Lents et al. | |
| 6,695,094 B2 | 2/2004 | Moffat et al. | |
| 6,698,180 B2 | 3/2004 | Snyder | |
| 6,704,625 B2 | 3/2004 | Albero et al. | |
| 6,735,951 B2 | 5/2004 | Thompson | |
| 6,755,375 B2 | 6/2004 | Trikha | |
| 6,777,822 B1 | 8/2004 | Suttie et al. | |
| 6,778,414 B2 * | 8/2004 | Chang et al. | 363/67 |
| 6,834,831 B2 * | 12/2004 | Daggett | 244/58 |
| 6,884,636 B2 | 4/2005 | Fiorini et al. | |
| 6,928,832 B2 | 8/2005 | Lents et al. | |
| 6,953,100 B2 | 10/2005 | Aberle et al. | |
| 6,995,993 B2 | 2/2006 | Sarlioglu et al. | |
| 7,024,874 B2 | 4/2006 | Zywiak et al. | |
| 7,098,555 B2 | 8/2006 | Glahn et al. | |
| 7,121,100 B2 | 10/2006 | Atkey et al. | |
| 7,207,521 B2 * | 4/2007 | Atkey et al. | 244/58 |
| 7,210,652 B2 | 5/2007 | Heln et al | |
| 7,210,653 B2 * | 5/2007 | Atkey et al. | 244/58 |
| 7,222,001 B2 * | 5/2007 | Frost et al. | 700/286 |
| 7,267,297 B2 | 9/2007 | Campbell et al. | |
| 7,285,753 B2 | 10/2007 | Hoehne et al. | |
| 7,285,871 B2 | 10/2007 | Derouineau | |
| 7,334,422 B2 | 2/2008 | Zywiak et al. | |
| 7,344,107 B2 | 3/2008 | Campbell et al. | |
| 7,364,116 B2 | 4/2008 | Nguyen et al. | |
| 7,373,222 B1 | 5/2008 | Wright et al. | |
| 7,400,065 B2 | 7/2008 | Michalko | |
| 7,406,370 B2 | 7/2008 | Kojori et al. | |
| 7,431,238 B2 * | 10/2008 | Hoffjann et al. | 244/58 |
| 7,513,119 B2 | 4/2009 | Zielinski et al. | |
| 7,523,622 B2 | 4/2009 | Zywiak et al. | |
| 7,550,866 B2 * | 6/2009 | Breit et al. | 307/9.1 |
| 7,687,927 B2 * | 3/2010 | Shander et al. | 290/7 |
| 7,872,368 B2 | 1/2011 | Karimi et al. | |
| 7,950,606 B2 | 5/2011 | Atkey et al. | |
| 8,049,360 B2 | 11/2011 | Karimi et al. | |
| 8,136,756 B2 * | 3/2012 | Duces et al. | 244/58 |
| 8,232,670 B2 | 7/2012 | Breit et al. | |
| 8,319,370 B2 | 11/2012 | Itoh et al. | |
| 2004/0061380 A1 | 4/2004 | Hann et al. | |
| 2004/0124308 A1 * | 7/2004 | Daggett | 244/58 |
| 2005/0121978 A1 | 6/2005 | McAvoy | |
| 2005/0151517 A1 * | 7/2005 | Cook et al. | 323/207 |
| 2005/0178903 A1 | 8/2005 | Boorman et al. | |
| 2005/0231038 A1 | 10/2005 | Marin-Martinod et al. | |
| 2006/0061213 A1 | 3/2006 | Michalko | |
| 2006/0085100 A1 | 4/2006 | Marin-Martinod et al. | |
| 2006/0168968 A1 | 8/2006 | Zielinski et al. | |
| 2006/0219842 A1 | 10/2006 | Shell et al. | |
| 2006/0267406 A1 | 11/2006 | Mehrer et al. | |
| 2007/0023210 A1 | 2/2007 | Bernardi et al. | |
| 2007/0031303 A1 * | 2/2007 | Kaiser et al. | 422/177 |
| 2007/0063098 A1 | 3/2007 | Dionne | |
| 2007/0069078 A1 | 3/2007 | Hoffjann et al. | |
| 2007/0110861 A1 | 5/2007 | Hoffjann et al. | |
| 2007/0120014 A1 | 5/2007 | Elmers et al. | |
| 2007/0267540 A1 * | 11/2007 | Atkey et al. | 244/58 |
| 2007/0284480 A1 * | 12/2007 | Atkey et al. | 244/135 R |
| 2008/0001026 A1 | 1/2008 | Hoffjann et al. | |
| 2008/0038597 A1 | 2/2008 | Hoffjann et al. | |

(56) References Cited

U.S. PATENT DOCUMENTS

| | | | |
|---|---|---|---|
| 2008/0058998 | A1 | 3/2008 | Breit |
| 2008/0077802 | A1 | 3/2008 | Richardson et al. |
| 2008/0127411 | A1 | 6/2008 | Hoffjann et al. |
| 2008/0150356 | A1* | 6/2008 | Breit et al. ............... 307/9.1 |
| 2008/0191094 | A1 | 8/2008 | Heinrich et al. |
| 2008/0246337 | A1 | 10/2008 | Michalko |
| 2008/0283663 | A1 | 11/2008 | Space et al. |
| 2009/0015063 | A1 | 1/2009 | Michalko |
| 2009/0103221 | A1 | 4/2009 | Aronson et al. |
| 2009/0118874 | A1 | 5/2009 | White et al. |
| 2009/0127855 | A1* | 5/2009 | Shander et al. ............... 290/7 |
| 2009/0152942 | A1 | 6/2009 | Waite et al. |
| 2009/0218888 | A1 | 9/2009 | Lorhammer et al. |
| 2010/0102625 | A1 | 4/2010 | Karimi et al. |
| 2010/0193630 | A1* | 8/2010 | Duces et al. ............... 244/58 |
| 2010/0203818 | A1 | 8/2010 | Gray et al. |
| 2010/0221642 | A1 | 9/2010 | Frahm et al. |
| 2010/0259859 | A1* | 10/2010 | Prabhu K et al. ............... 361/62 |
| 2010/0283318 | A1 | 11/2010 | Crane et al. |
| 2011/0039171 | A1* | 2/2011 | Hibbs et al. ............... 429/417 |
| 2011/0198918 | A1* | 8/2011 | Langlois et al. ............... 307/9.1 |
| 2012/0056474 | A1 | 3/2012 | Larson et al. |
| 2012/0138737 | A1* | 6/2012 | Bruno et al. ............... 244/58 |
| 2012/0232728 | A1 | 9/2012 | Karimi et al. |

FOREIGN PATENT DOCUMENTS

| | | |
|---|---|---|
| DE | 69712797 T2 | 11/2002 |
| DE | 10249588 A1 | 5/2004 |
| EP | 0888966 A2 | 1/1999 |
| EP | 0923488 B1 | 4/2002 |
| EP | 1010618 B1 | 5/2002 |
| EP | 1650846 A1 | 4/2006 |
| EP | 1686058 A1 | 8/2006 |
| EP | 1686055 B1 | 11/2007 |
| JP | 57113919 A | 7/1982 |
| JP | 05163925 A | 6/1993 |
| JP | 2000516553 A | 12/2000 |
| WO | 9805553 A1 | 2/1998 |
| WO | 0147100 A1 | 6/2001 |
| WO | 02066323 A2 | 8/2002 |
| WO | 2004037641 A2 | 5/2004 |
| WO | 2006058774 A2 | 6/2006 |
| WO | 2008113850 A2 | 9/2008 |

OTHER PUBLICATIONS

"All-Electric Aircraft", IEEE/AESS Symposium, Dayton, Ohio, Nov. 30, 1983, vol. I and vol. II, IEEE, Piscataway, New Jersey, 92 pages.

"Meeting Minutes from the NASA PBW Critical Design Review (CDR)", Jun. 10-12, 1996, McDonnell Douglas Aerospace, Long Beach, California, 524 pages.

"Model 'A' Ford Tapered Muffler", Aries Limited, retrieved on May 28, 2004, Saratoga, CA, 1 page.

"Short Shetland—Review of Britain's Largest Aircraft", Flight Magazine, May 17, 1945, Flight Magazine, pp. 529-534.

"The Shetland II", Flight Magazine, Dec. 6, 1945, Flight Magazine, pp. 607-608.

"The Short Shetland", Aeronautics Magazine, Jul. 1945, pp. 38-39.

"What About Transfer Switches?" retrieved from http://www.generatorjoe.net/html/WhatAboutsws.asp, accessed on Aug. 9, 2007, GeneratorJoe Inc., Santa Rosa, CA, pp. 1-8.

Brady, C., Image of AC & DC Metering panel, The Boeing 737 Technical Site, accessed Aug. 9, 2007, 1 page.

Electrically Powered Actuators, Aerospatiale Matra Airbus 2000, 1 page.

European Patent Office Extended European Search Report for EP Patent Application EP10250159.0/2422/2213571, dated Oct. 31, 2011, 7 pages.

Figure 5 from p. 13 of Boeing Airliner Magazine, Oct.-Dec. 1994, p. 13.

GE Develops a Starter/Generator with Pentek Boards, Written in the Summer of 1994; Updated: Summer 1996, 2 pages.

International Search Report and Written Opinion of the International Searching Authority, International Application No. PCT/US2009/057540, Jun. 29, 2010, European Patent Office, 10 pages.

International Search Report and Written Opinion of the International Searching Authority, International Application No. PCT/US2012/024688, European Patent Office, Jun. 28, 2012, 15 pages.

International Search Report for Application No. PCT/US03/33542 mailed Jun. 1, 2004, 6 pages.

"F-16 Test Aircraft Completes Long Distinguished Career", Air Force Research Laboratory/AFRL, Science and Technology for Tomorrow's Aerospace Forces, Success Stories, 2001, 2 pages.

Andrade, L. et al., "Design of the Boeing 777 Electric System," Proceedings of the IEEE 1992 National Aerospace and Electronics Conference (NAECON) 1992, May 1992, vol. 3, IEEE, Piscataway, New Jersey, pp. 1281-1290.

"Titanium Oval Muffler", Michael Andretti Powersports, retrieved on May 28, 2004, 2 pages.

Brady, C. "Auxiliary Power Unit The APU described", The Boeing 737 Technical Site, <http://www.b737.org.uk/apu.htm>, updated Jun. 18, 2007, accessed Aug. 9, 2007, pp. 1-12.

Cartier, J.C., "Power Quality Analysis in a CC-130 Hercules Aircraft Power Distribution System", Master of Engineering Thesis, Jan. 1999, Department of Electrical and Computer Engineering, Royal Military College of Canada, Kingston, Ontario, pp. 1-106 and appendices.

Chang, M. et al., "Preliminary (Issue #1) Power-by-Wire Development and Demonstration—Electrical Power Center Module Requirements and Specifications", Report No. MDS 93K0460, Nov. 1994, NASA, pp. 1-55 and appendices.

Chang, M. et al., "Preliminary (Issue #3) Power-by-Wire Development and Demonstration—Power Management and Distribution Requirements and Specifications", Report No. MDC 93K0451; Jun. 1995, NASA, pp. 1-64 and appendices.

"Henri Coanda", Internet biography retrieved on May 28, 2004, pp. 1-3.

Cronin, M.J., "The All-Electric Airplane as an Energy Efficient Transport", SAE Technical Paper 801131, Sep. 1, 1980, SAE International, Warrendale, PA, pp. 1-15.

Emadi, A. et al., "Electrical System Architectures for Future Aircraft", SAE Technical Paper 1999-01-2645, Aug. 2, 1999, SAE International, Warrendale, PA, pp. 1-5.

Ernst, J., "Embedded Reasoning Model-based design for highly reconfigurable systems", 2006, Palo Alto Research Center, Palo Alto, CA, pp. 1-5.

Feiner, L. et al, Power-By-Wire Program Plan, NASA Lewis Planning Meeting, Oct. 19, 1993, Cleveland, OH, 65 pages.

Fromherz, M. et al., "Coordinated Control for Highly Reconfigurable Systems," Hybrid Systems: Computation and Control, 8th International Workshop, HSCC 2005, Zurich, Switzerland, Mar. 9-11, 2005 Proceedings, Springer Lecture Notes in Computer Science, vol. 3414, 2005, Springer Berlin Heidelberg, 1-24 with accompanying slides.

Fronista, G., "Electrical Actuation for Aircraft Flight Control Surfaces", retrieved from http://www.afrlhorizons.com/Briefs/Dec01/PR0103.html, Dec. 2001, Air Force Research Laboratory's Propulsion Directorate, Power Division, Electrical Technology Branch, Wright-Patterson AFB, OH, 2 pages.

Glennon, T., "Fault Tolerant Generating and Distribution System Architecture", IEE Colloquium on All Electric Aircraft (Digest No. 1998/260), Jun. 1998, IEEE, Pisctataway, New Jersey, pp. 1-4.

Goldberg, J. et al., "A Commercial Application of the Electro-Expulsive Deicing System", AAIA 98-DCHS, 36th Aerospace Sciences Meeting & Exhibit, Jan. 12-15, 1998, Reno, Nevada, 8 pages.

Electric flight systems: proceedings of a workshop held in Hampton, Virginia, Jun. 9-10, 1981, NASA Conference Publication 2209, Edited by Groom, N. et al, 1982, National Aeronautics and Space Administration Scientific and Technical Information Branch, Springfield, VA, 267 pages.

Holly, H., "The Closed-Loop Air-Cycle Option for Equipment Cooling on Aircraft", SAE Technical Paper 840940, Twelfth Intersociety

(56) References Cited

OTHER PUBLICATIONS

Conference on Environmental Systems, Jul. 16-19, 1984, San Diego, CA, SAE, Warrendale, PA, 9 pages.

Holmdahl, M., "Putting New All Electric Technology Development to the Test", Proceedings of the IEEE 1983 National Aerospace and Electronics Conference, NAECON 1983, 1983, vol. 1, IEEE, Piscataway, New Jersey, pp. 74-79.

Jarck, B., "Electrical Power Systems", Second International Aeronautical Conference, New York, May 24-27, 1949, Institute of the Aeronautical Sciences, New York, pp. 447-448.

Murray, W.E. et al., "Evaluation of All-Electric Secondary Power for Transport Aircraft", NASA Contractor Report 189077, Jan. 24, 1992, National Technical Information Service, NTiS, U.S. Department of Commerce, Springfield, Virginia, 315 pages.

Rosenbush, F., "ECS Schemes for All Electric Airliners", SAE Technical Paper 820870, Twelfth Intersociety Conference on Environmental Systems, Jul. 19-21, 1982, San Diego, CA, 14 pages.

Sinnett, M., "787 No-Bleed Systems: Saving Fuel and Enhancing Operational Efficiencies", Aero Quarterly, 2007, 4th Quarter, Aero Magazine, Boeing Commercial Airplanes, Seattle, Washington, pp. 6-11.

Tagge, G., "Secondary Electric Power Generation with Minimum Engine Bleed", Aircraft Electric Secondary Power: Proceedings of a conference held at NASA Lewis Research Center, Cleveland Ohio, Sep. 14-15, 1982, NASA Conference Publication 2282, pp. 37-49.

Tagge, G.E. et al., "Systems Study for an Integrated Digital-Electric Aircraft" (IDEA), NASA Contractor Report 3840, Jan. 1985, National Technical Information Service, NTiS, U.S. Department of Commerce, Springfield, Virginia, pp. 1-209.

Wakefield, G., "Aircraft Electrical Engineering", Royal Aeronautical Society Textbook No. 4, 1959, Chapman & Hall Publishing, London, England, pp. 226, 248-249.

Weimer, J. A., "21st Century Plane Powering the United States Air Force", Presented at: Indiana Energy Technology Sizzle, Purdue University, Nov. 11, 2004, pp. 1-14.

Wild, T.W., "Transport Category Aircraft Systems", Jan. 1, 2008, 3rd Edition, Jeppesen Sanderson, Inc., Inverness, Colorado, 4 pages.

Williams, K., "Integrated Power Systems for Future Transport Aircraft", SAE Technical Paper 971247, Transport Aircraft Division; McDonnell Douglas Aerospace, Jun. 18, 1997, 9 pages.

Zeffert, H., "Principals and Practice of Aircraft Electrical Engineering", Aircraft Electrical Engineering, 1960, Newnes, London, England, pp. 32-33.

Zelazo, D. et al., "Adaptive Load Management", Sep. 17, 2007, University of Washington, Seattle, WA, pp. 1-40.

* cited by examiner

INDEPENDENT POWER GENERATION IN AIRCRAFT

CLAIM OF PRIORITY

The present application claims priority from and is a divisional application of U.S. patent application Ser. No. 12/558,177, entitled "INDEPENDENT POWER GENERATION IN AIRCRAFT", and filed Sep. 11, 2009, the contents of which is expressly incorporated herein by reference in its entirety.

FIELD OF THE DISCLOSURE

The present disclosure is generally related to independent generation of power in aircraft.

BACKGROUND

In current aircraft that employ jet engines, power is extracted from the engines to power various components of the aircraft. For example, the engines may be used to turn generators, compressors or pumps, via a mechanical linkage to extract power directly from the engines. In another example, bleed air may be diverted away from a core of the engine for uses other than providing thrust to the aircraft. Power extraction in high by-pass ratio turbofan engines may increase thrust specific fuel consumption of these engines. In addition, idle speeds of these engines may be increased in order to provide sufficient power for the aircraft during ground, decent, approach and landing phases of flight thus increasing specific fuel consumption of the engine.

SUMMARY

Systems and methods of independent power generation in aircraft are disclosed. In a particular embodiment, an aircraft includes at least one engine and a plurality of independent power units. Each power unit of the plurality of independent power units generates electricity independently of the at least one engine. The plurality of independent power units includes at least a first independent power unit that generates first electricity having a first set of electrical characteristics and a second independent power unit that generates second electricity having a second set of electrical characteristics concurrently with the first power unit generating the first electricity. The first set of electrical characteristics is different than the second set of electrical characteristics.

In another particular embodiment, a method includes generating thrust at one or more engines of an aircraft. The method further includes generating first electricity at a first power unit that is independent of the one or more engines of the aircraft. The method also includes, concurrently with generating the first electricity, generating second electricity at a second power unit that is independent of the one or more engines of the aircraft.

In another particular embodiment, an aircraft includes a body that has a first independent power unit. The first independent power unit provides power to a first set of powered devices. The body also includes a second independent power unit that provides power to a second set of powered devices concurrently with the first independent power unit providing power to the first set of powered devices. The first set of powered devices is different than the second set of powered devices. The aircraft also includes at least one engine coupled to the body. Neither the first independent power unit nor the second independent power unit receives operational power from the at least one engine.

DETAILED DESCRIPTION

The features, functions, and advantages that are described can be achieved independently in various embodiments disclosed herein or may be combined in yet other embodiments further details of which can be shown with reference to the following description and drawings.

Figure 1:
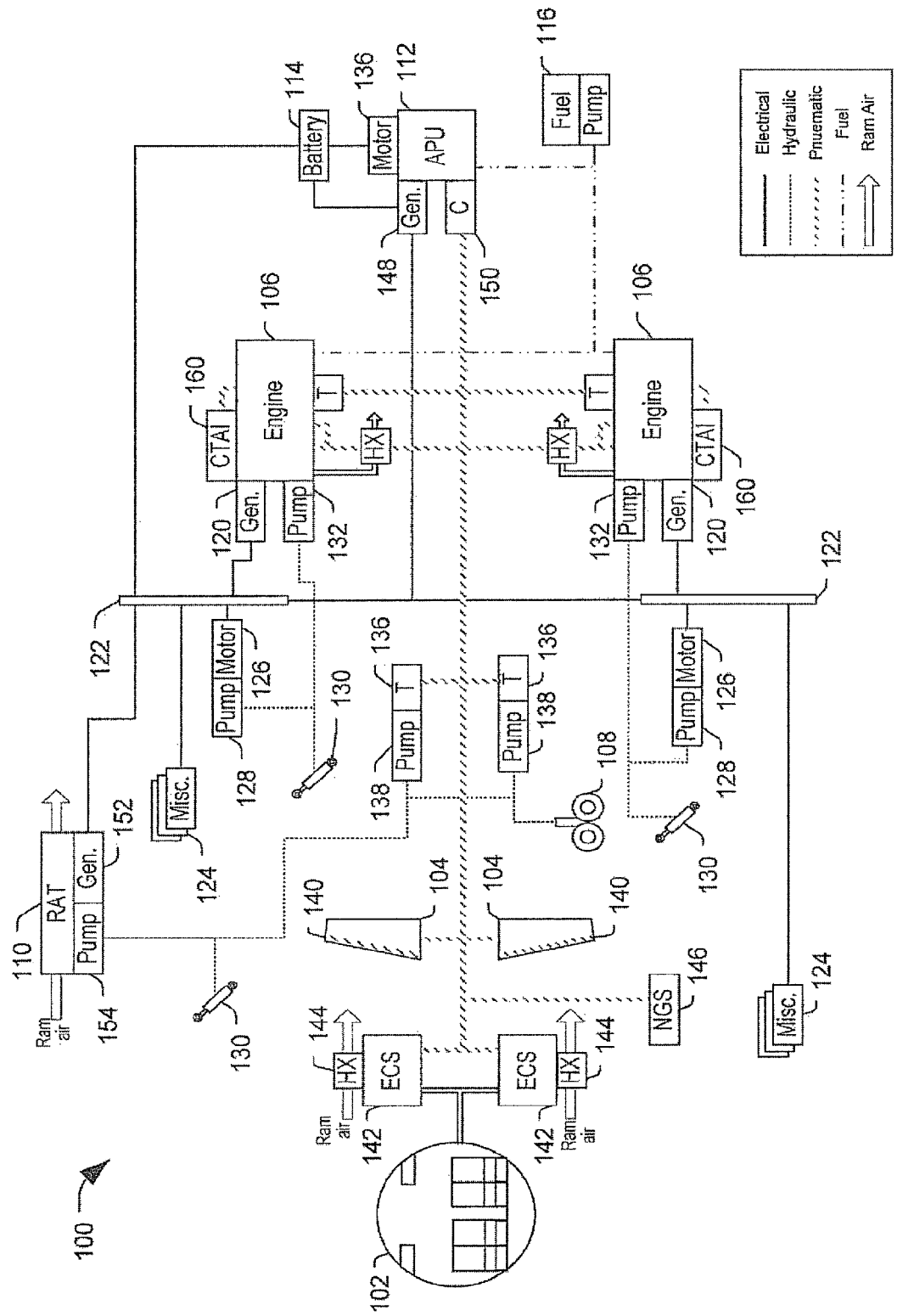
FIG. 1 is a block diagram of a conventional architecture of an aircraft.

FIG. 1 is a block diagram of a conventional architecture of an aircraft 100. In a particular configuration, the aircraft 100 includes a fuselage 102, a plurality of wings 104, one or more engines 106, and landing gear 108. The engines 106 generate thrust to propel the aircraft:. Additionally, the engines 106 may be used to enable operation of various aircraft: systems. For example, a portion of the power generated by the engines 106 may be used to turn generators 120 to generate electrical power. To illustrate, the generators 120 may be coupled to the engines 106 via various mechanical linkages, such as transmission systems, to utilize rotation in the engines 106 to turn the generators 120 to generate the electrical power. The electrical power may be distributed throughout the aircraft 100 via one or more power interconnects 122 to power one or more powered systems 124 (labeled "MISC." in FIG. 1 since the powered systems 124 could include any system of the aircraft: 100 that uses electrical power). In particular configurations, substantially all of the electrical power utilized in the aircraft: 100 is generated using the generators 120 during normal operation (i.e., non-emergency, non-startup operations).

A portion of the power generated by the engines 106 may be used to pressurize a hydraulic system. For example, a portion of the electrical power generated by the generators 120 may be used at motors 126 to operate pumps 128 that pressurize the hydraulic system. In another example, the hydraulic system may be pressurized by pumps 132 that are coupled to the engines 106 via mechanical linkages. That is, the pumps 132 are operated by rotation of the engine 106 to pressurize the hydraulic system. The hydraulic system may power one or more hydraulic actuators 130 that move various aircraft: components, such as flight control surfaces. Depending on the particular configuration, the pumps 128 or the pumps 132 may be supplemental or back-up systems that are operated only when other pumps are not operational. To illustrate, the pumps 128 may pressurize the hydraulic system during normal (e.g., non-emergency) operation; however, if the aircraft 100 experiences an electrical power failure, the pumps 132 may pressurize the hydraulic system using power from the engines 106.

A portion of the power generated by the engines 106 may also be used for deicing. For example, bleed air from the engines 106 may be provided to a cowl thermal anti-icing (CTAI) system 160. The CTAI systems 160 may provide de-icing functions at an engine nacelle housing each of the engines 106.

Bleed air may also be taken from the engines 106 to operate a pneumatic system. The pneumatic system distributes pressurized air to the aircraft 100 to operate or to provide backup operation of various systems. For example, the pneumatic system may be used to power one or more turbines 136 that operate pumps 138. The pumps 138 may pressurize the hydraulic system to operate various hydraulic devices, such as one or more of the actuators 130, the landing gear 108, or other system. The pneumatic system may also provide air to a wing de-icing system 140. The pneumatic system may provide pressurized air to an environmental control system (ECS) 142. The ECS 142 may include a heat exchanger (HX) 144. The ECS 142 may utilize the pressurized air and ram air to provide environmental controls, such as cooling air to the fuselage 102 of the aircraft 100. The pneumatic system may also provide pressurized air to a nitrogen generation system (NGS) 146 that generates nitrogen or nitrogen-enriched air for use in providing an inert environment for one or more fuel tanks 116.

To receive an Extended-range Twin-Engine Operational Performance Standards (ETOPS) rating, the aircraft 100 may also include an auxiliary power unit (APU) 112. The APU 112 may power the electric distribution system. For example, the APU 112 may burn fuel from the fuel tanks 116 to operate a generator 148 that is coupled to the power interconnects 122. The APU 112 may provide power to one or more of the powered devices 124, motors 126, etc., when the engines 106 are not operating or to supplement power provided by the engines 106. The APU 112 may also operate a compressor 150 to pressurize the pneumatic system when the engines 106 are not operating or to supplement pressurization provided by the engines 106. The APU 112 may be started by power provided from a main battery 114. In certain configurations, the APU 112 is used to start the engines 106.

To receive an ETOPS rating, the aircraft 100 may also include a ram air turbine (RAT) 110. The RAT 110 may provide emergency power to the aircraft 100 in the event of a problem with one or more of the engines 106. For example, the RAT 110 may be turned by ram air to operate a generator 152 coupled to the power interconnects 122 to provide emergency power to one or more of the powered devices 124, the motors 126, etc. Additionally, the RAT 110 may operate a pump 154 to pressurize the hydraulic system to operate one or more of the actuators 130, the landing gear 108, or other hydraulic devices.

Figure 2:
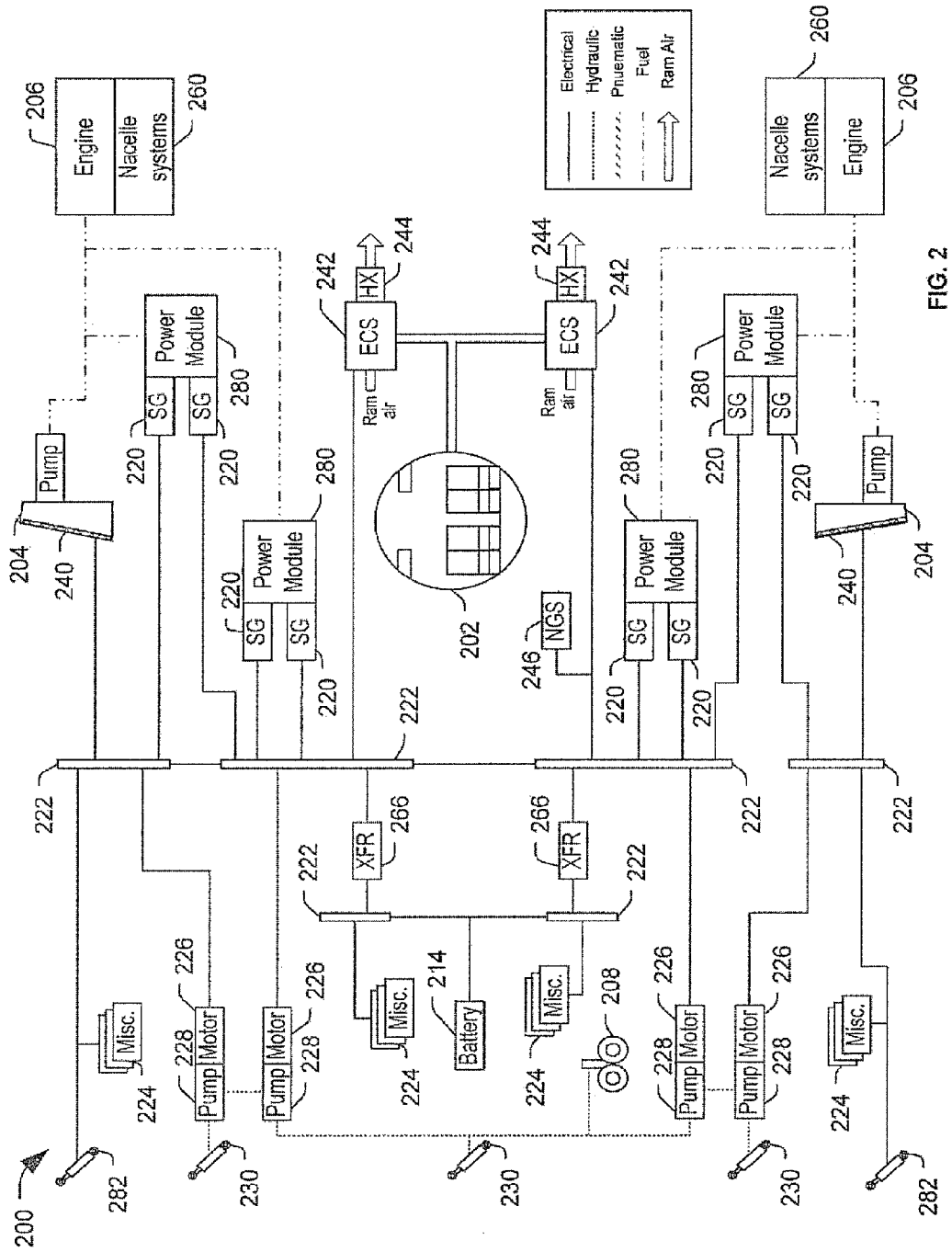
FIG. 2 is a diagram of an aircraft architecture to independently generate power in an aircraft according to a particular embodiment.

FIG. 2 is a diagram of an aircraft architecture to independently generate power in an aircraft 200 according to a particular embodiment. In a particular embodiment, the aircraft 200 includes a fuselage 202, a plurality of wings 204, one or more engines 206, and landing gear 208. In a particular embodiment, the architecture of the aircraft 200 is arranged such that the engines 206 are only used to generate thrust to propel the aircraft 200 and to power nacelle systems 260 located at engine nacelles housing the engines 206. The nacelle systems 260 may include, for example, nacelle de-icing systems. Other systems of the aircraft 200 may be powered by a plurality of power modules 280. In a particular embodiment, one or more of the power modules 280 is a line replaceable unit (LRU).

In a particular embodiment, the power modules 280 are independent or standalone power units. That is, each of the power modules 280 may generate electricity independently of the engines 206. Additionally, each of the power modules 280 may generate electricity independently of other power modules 280. For example, the plurality of power modules 280 may operate concurrently or at different times depending on operational needs of systems powered by each of the plurality of power modules 280. To illustrate, two or more of the power modules 280 may operate concurrently to provide power to various powered systems 224. In another illustration, two or more of the power modules 280 may operate concurrently during a first time period. However, during a second time period, one or more of the power modules 280 may cease generating power. For example, the first time period may be a period of high power demand and the second time period may be a period of reduced power demand. Thus, during the first time period, supplemental power modules may be active to provide supplemental power; however, during the second time period, the supplemental power may not be needed and the supplemental power modules may be idled or turned off.

In various embodiments, the power modules 280 may be of the same type, or two or more of the power modules 280 may be of different types. The power modules 280 may include any type or combination of power generation devices. For example, one or more of the power modules 280 may include a mechanical power generation device, such as a rotating engine (e.g., a centrifugal or axial turbine), a reciprocating engine (e.g., an internal combustion engines such as a diesel engine, a gasoline engine, or an engine that utilize another type of fuel). In another example, one or more of the power modules 280 may include a chemical power generation device, such as a fuel cells or a battery. In still another example, one or more of the power modules 280 may include another power generation device, such as a solar cell or a nuclear reactor. The power modules 280 may include any number and combination of mechanical, chemical or other power generation devices. For example, the power modules 280 may include four mechanical power generation devices. In another example, the power modules 280 may include two mechanical power generation devices, a fuel cell and a nuclear reactor. In still another example, a first of the power modules 280 may be a diesel or gas generator, a second of the power modules 280 may be a fuel cell, and a third of the power modules 280 may be a gas turbine. Other combinations of types of the power modules 280 are also possible.

Figure 3:
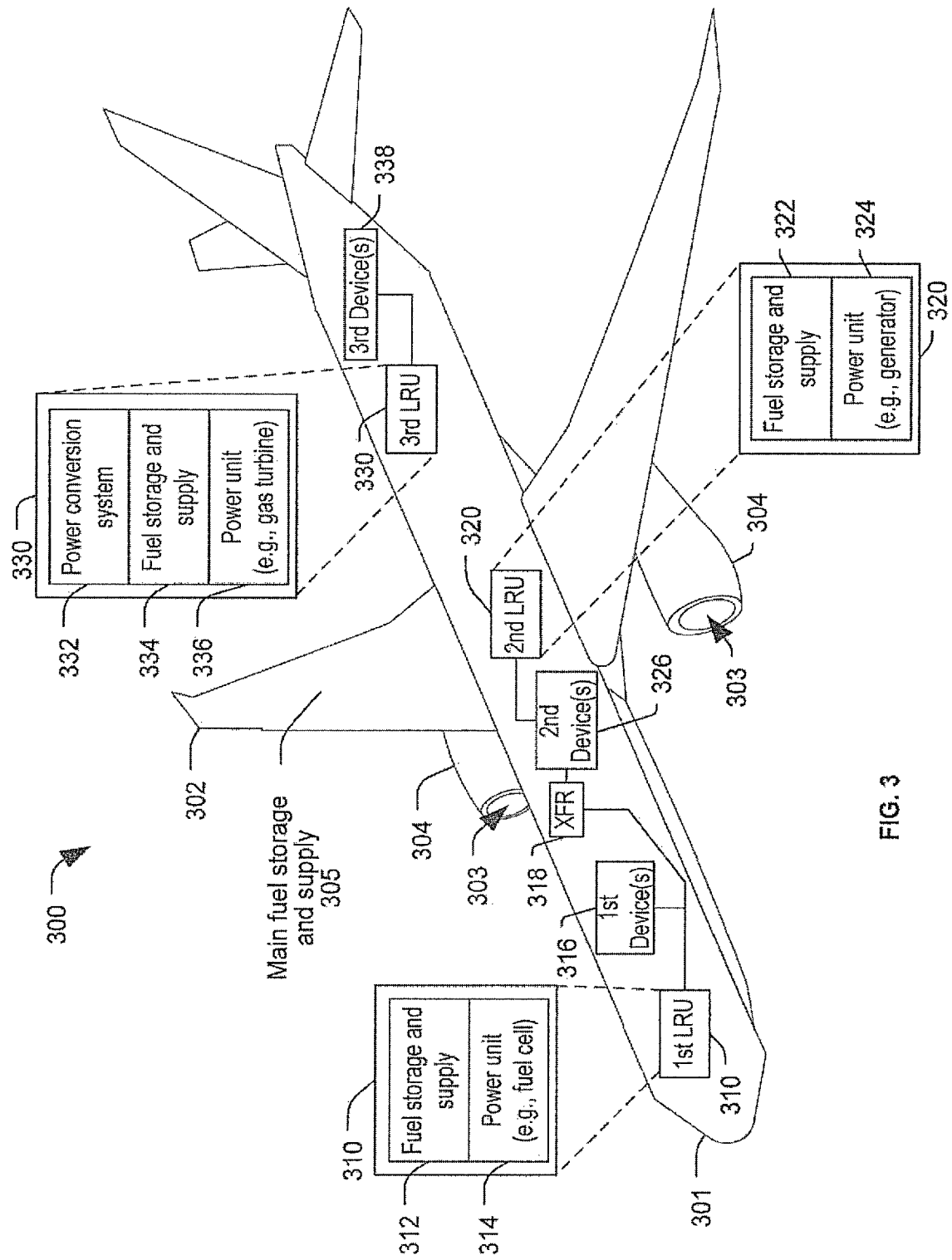
FIG. 3 is a diagram of an embodiment of an aircraft with independent power generation.

In a particular illustrative embodiment, the engines 206 receive fuel from a main fuel system (such as fuel tanks in the wings 204, the fuselage 202, external tanks (not shown), or any combination thereof), and the power modules 280 receive fuel from an independent fuel system (shown in FIG. 3). Thus, one or more of the power modules 280 may be independent from a fuel system that provides fuel to the engines 206. Additionally, one or more of the power modules 280 may receive fuel from a fuel system that is independent of a fuel system that provides fuel to one or more of the other power modules 280. In a particular embodiment, the power modules 280 use a different type of fuel than the engines 206. For example, the engines 206 may utilize a jet fuel whereas one or more of the power modules 280 may utilize a diesel fuel. In a particular embodiment, one or more of the power modules 280 may use a different type of fuel than one or more of the other power modules 280. For example, a first of the power modules 280 may include a diesel generator that uses diesel fuel and a second of the power modules 280 may include a gas turbine that uses a jet fuel.

Each of the power modules 280 generate power having a particular set of electrical characteristics, such as a frequencies or frequency range, a voltage or voltage range, current type (e.g., alternating current or direct current), and so forth. In a particular embodiment, two or more of the power modules 280 generate power having different electrical characteristics. For example, a first of the power modules 280 may generate direct current (DC) and a second of the power modules 280 may generate alternating current (AC). In another example, the first of the power modules 280 may generate power having a first frequency range and the second of the power modules 280 may generate power having a second frequency range that is different from the first frequency range. Since the power modules 280 may be independent of the engines 206, the first frequency range, the second frequency range or both may be independent of an operating speed (e.g., frequency of rotation or a number of revolutions per minute (RPMs)) of the engines 206. In yet another example, the first of the power modules 280 may generate power having a first voltage range and the second of the power modules 280 may generate power having a second voltage range that is different from the first voltage range.

The power generated by the power modules 280 may be provided to various powered devices of the aircraft 200, as described further below. Weight of the aircraft 200 may be reduced by positioning a particular power module 280 near one or more powered devices that have power requirements that substantially match the electrical characteristics of power generated by the particular power module 280. For example, when the particular power module 280 generates 28 V DC power, the power module may be located near powered devices that require 28 V DC power. Thus, distribution wiring to distribute the power to the powered devices may be reduced due to placement of the particular power module 280. Additional weight savings may be attained since the power is generated with electrical characteristics that substantially match the power requirements of the powered devices. For example, in FIG. 1, the generators 120 may generate AC power that is converted to DC power using a rectifier. However, since one of the particular power modules 280 generates DC power directly, no rectifier or other power conversion devices may be needed, resulting in weight savings for the aircraft 200. Similar savings may be attained by providing power to other powered devices from power modules 280 that generate power with electrical characteristics that substantially match power requirements of the other powered devices. Stated another way, weight savings may be attained by natively generating power (i.e., without conversion operations) having electrical characteristics that substantially match power requirements of devices to be powered.

In a particular embodiment, one or more of the power modules 280 is coupled to starter/generators (SO) 220. The starter/generators 220 may provide electrical power to a power distribution system of the aircraft 200. The electrical power may be distributed within the aircraft 200 via one or more power interconnects 222 to power one or more powered systems 224. For example, a portion of the power generated by the power modules 280 may be used to power one or more motors 226 that operate pumps 228 to pressurize a hydraulic system of the aircraft 200. The hydraulic system may drive one or more hydraulic actuators 230, the landing gear 208, or other hydraulic components. In another example, a portion of the power generated by the power modules 280 may be used to power one or more electrical actuators 282. The hydraulic actuators, the electrical actuators, or any combination thereof, may move various aircraft components, such as flight control surfaces.

In yet another example, a portion of the power generated by the power modules 280 may be used to power a de-icing system 240. In a particular embodiment, the de-icing system 240 provides de-icing to the wings 204, and de-icing of the engine nacelles is be provided by the nacelle systems 260, e.g., using bleed air from the engines 206.

In still another example, a portion of the power generated by the power modules 280 may be used to power an environmental control system (ECS) 242. The ECS 242 may utilize ram air and a heat exchanger (HX) 244 to temperature condition air to provide environmental controls, such as cooling air, to the fuselage 202 of the aircraft 200. A portion of the power generated by power modules 280 may be used to power a nitrogen generation system (NGS) 246 that generates nitrogen or nitrogen enriched air that is used to provide an inert environment for one or more fuel tanks of the aircraft 200.

In a particular embodiment, certain systems of the aircraft 200 may have different power requirements than other systems. For example, certain of the powered systems 224 may have different power requirements than the motors 226. Accordingly, the power distribution system may include transformers, rectifiers or other devices that modify electrical characteristics of the power (generically referred to here as transformers (XFR) 266). The transformers 266 may modify a frequency of the power, a voltage of the power, convert the power from AC to DC, convert the power from DC to AC, modify other characteristics of the power, or any combination thereof. For example, the transformers 266 may modify electrical characteristics of the power generated by one or more of the power modules 280 to enable charging of the battery 214. The transformers 266 may also modify power provided by the battery 214 to enable the battery 214 to power one or more of the powered devices 224.

In certain embodiments, the transformers 266 may modify the electrical characteristics of the power generated by a first of the power modules 280 to be substantially similar to the electrical characteristics of the power generated by a second of the power modules 280. In these embodiments, the first power module may act as a backup to the second power module. Thus, if the second power module encounters an operational problem, power from the first power module can be routed to the systems that are normally (i.e., during non-emergency circumstances) powered from the second power module. Since the power modules 280 can back each other up during emergencies, in at least one of these embodiments, the aircraft 200 may not have an auxiliary power unit, such as the APU 112 of FIG. 1. Additionally, in at least one of these embodiments, the aircraft 200 may not have a ram air turbine (RAT), such as the RAT 110 of FIG. 1. In at least one embodiment, the aircraft 200 may be certified for extended range operations under the Extended-range Twin-Engine Operational Performance Standards (ETOPS) without an APU, without a RAT or without both due to the capability of the power modules 280 to back each other up. For example, the aircraft 200 may achieve an ETOPS-120 rating authorizing twin engine operation 120 minutes from a diversion site, an ETOPS-180 rating authorizing twin-engine operation 180 minutes from a diversion site, or another ETOPS rating authorizing twin-engine operation at another distance from a diversion site.

FIG. 3 is a diagram of an embodiment of an aircraft 300 with independent power generation. In a particular embodiment, the aircraft 300 illustrated in FIG. 3 includes the aircraft architecture described with reference to FIG. 2. The aircraft 300 includes a body 301 and at least one engine (such as the engines 303) coupled to the body 301. Although the aircraft 300 is illustrated in FIG. 3 in a manner that resembles a commercial airliner, the aircraft 300 is not so limited. Rather, in various embodiments, the aircraft 300 includes a rotary wing aircraft, a blended wing body aircraft, a lifting body aircraft, or another heavier-than-air or lighter-than-air aircraft. The body 301 may include a portion or component of the aircraft 300 that is distinct from wings and control surfaces and that includes cargo or passenger cabins, if present. The body 301 may be pressurized or non-pressurized, or portions of the body 301 may be pressurized and other portions of the body 301 may be non-pressurized.

In a particular embodiment, the body 301 includes a fuselage, such as the fuselage 202 of FIG. 2. In an illustrative embodiment, the body 301 also includes fairings coupled to the fuselage. The aircraft 300 may also include a plurality of wings 302 coupled to the body 301. The engines 303 may be coupled to the body (e.g., the fuselage), to one or more of the wings 302 or to both. Each of the engines 303 may be housed in an engine nacelle 304. Fuel is provided to the engines 303 from one or more main fuel storage and supply systems 305. For example, the main fuel storage and supply system 305 may include fuel tanks housed in the wings 302, in the body 301, or in both.

In a particular embodiment, the aircraft 300 also includes a plurality of independent power units, such as a first independent power unit 314, a second independent power unit 324 and a third independent power unit 336. The independent power units 314, 324, 336 may generate power used by various components of the aircraft 300 independently of the engines 303. For example, the independent power units 314, 324, 336 may not receive operational power from the engines 303. Additionally, in a particular embodiment, the independent power units 314, 324, 336 may generate power independently of one another. In a particular embodiment, any combination of the independent power units 314, 324, 336 may operate concurrently to produce power. Further, one or more of the independent power unit 314, 324, 336 may act as a back up to one or more of the other independent power units 314, 324, 336. In a particular embodiment, no power used within the body 301 is derived from the engines 303. For example, no bleed air may be provided to the body 301 from the engines 303. Similarly, no mechanical linkages at the engines 303 may be used to generate electricity or to store mechanical energy (e.g., to pressurized hydraulic or pneumatic systems) used in the body 301. Rather, in a particular embodiment, the independent power units 314, 324, 336 may generate all of the power used by the aircraft 300 outside the engine nacelles 304. Accordingly, the engines 303 may provide thrust to the aircraft 300 with improved efficiency.

In a particular embodiment, each of the independent power units 314, 324, 336 is part of a line replaceable unit (LRU), such as a first LRU 310, a second LRU 320, and a third LRU 330, respectively. The LRUs 310, 320, 330 may be wholly integrated systems that are replaceable as a unit. For example, each of the LRUs 310, 320, 330 may have coupling connectors (such as plugs, wire harnesses, etc.) to connect the LRU 310, 320, 330 to power and/or control systems of the aircraft 300. Additionally, each of the LRUs 310, 320, 330 may have structural connectors to physically couple the LRU 310, 320, 330 to the aircraft 300 at a particular location designated for the LRU 310, 320, 330. Accordingly, when an LRU 310, 320, 330 or a component of the LRU 310, 320, 330 (such as one of the independent power units 314, 324, 336) fails, the entire LRU 310, 320, 330 can be disconnected and removed from the aircraft 300 as a unit and replaced with a different LRU. In a particular embodiment, the LRUs 310, 320, 330 may be interchangeable. For example, the first LRU 310 may be coupled to the aircraft 300 at a first location and the second LRU 320 may be coupled to the aircraft 300 at a second location. The first location may be remote from the second location. The first LRU 310 may be removed as a unit from the first location and reinstalled in the aircraft 300 at the second location in place of the second LRU 320.

In a particular embodiment, one or more of the LRUs 310, 320, 330 may include a power conversion system 332. In the particular embodiment illustrated in FIG. 3, the third LRU 330 includes the third independent power unit 336 and the power conversion system 332. The third independent power unit 336 may generate electricity having a first set of electrical characteristics (e.g., frequency, voltage, current, etc.). The power conversion system 332 may convert at least a portion of the electricity generated by the third independent power unit 336 to have a second set of electrical characteristics that is different from the first set of electrical characteristics.

In a particular embodiment, one or more of the LRUs 310, 320, 330 utilizes fuel from a source other than the main fuel storage and supply system 305. For example, the first power unit 314 of the first LRU 310 may be a fuel cell that uses a first fuel type provided by a first fuel storage and supply system 312; the second power unit 324 of the second LRU 320 may be a diesel generator that uses a second fuel type provided by a second fuel storage and supply system 322; and the third independent power unit 336 of the third LRU 330 may be a gas turbine that uses a third fuel type provided by a third fuel storage and supply system 334. In a particular embodiment, one or more of the fuel storage and supply systems 312, 322, 334 of the LRUs 310, 320, 330 is independent of the main fuel storage and supply system 305. In another particular embodiment, the main fuel storage and supply system 305 may be used as a back up fuel storage and supply system for one or more of the LRUs 310, 320, 330.

In a particular embodiment, each of the LRUs 310, 320, 330 is upgradable as a unit. For example, advances in technology may cause a particular type of power generation technology to be superior in one or more ways to a type of power generation technology used by one or more of the power units 314, 324, 336. For example, the particular type of power generation technology may become lighter, more efficient, able to use cheaper fuel, more reliable etc. In that case, one or more of the LRUs 310, 320, 330 may be removed and replaced with a new LRU that has a new power unit that uses the particular power generation technology. Additionally, the new LRU may include a new fuel storage and supply system that provides fuel appropriate for the new power unit. Further, the new LRU may include a power conversion system to convert power generated by the new LRU to have desired electrical characteristics, such as electrical characteristics that substantially match power requirements of devices to be powered by the new LRU.

In a particular embodiment, the LRUs 310, 320, 330 are distributed at different locations within the aircraft 300. For example, the first LRU 310 may be physically located near a first set of powered devices 316 that receive power from the first LRU 310; the second LRU 320 may be physically located near a second set of powered devices 326 that receive power from the second LRU 320; and the third LRU 330 may be physically located near a third set of powered devices 338 that receive power from the third LRU 330. In a particular embodiment, one or more of the LRUs 310, 320, 330 output power that has electrical characteristics that substantially match power requirements of the respective powered devices 316, 326, 338. For example, the first powered device 316 may use 28 V direct current (DC) power and the first LRU 310 may output approximately 28 V DC power. The second powered device 326 may use 270 V DC power and the second LRU 310 may output approximately 270 V DC power. Similarly, the third powered devices 338 may use 400 Hz, 230 V three-phase alternating current (AC) power and the third LRU 330 may output approximately 400 Hz, 230 V three-phase AC power. By locating one or more of the LRUs 310, 320, 330 near the powered devices 316, 326, 338 that receive power from the LRU 310, 320, 330 and that have power requirements that substantially match electrical characteristics of power generated by the LRU 310, 320, 330, weight associated with power distribution components (e.g., wiring) and power conversion components (e.g., rectifiers, transformers, etc.) can be reduced.

In a particular embodiment, one or more of the LRUs 310, 320, 330 may act as a backup to one or more of the other LRUs 310, 320, 330. For example, as depicted in FIG. 3, the first LRU 310 may back up the second LRU 320. To illustrate, the first LRU 310 may provide power to the first powered devices 316 and, when needed, to the second powered devices 326. Since the first powered devices 316 and the second powered devices 326 may have different power requirements, a power conversion system may be provided. For example, a transformer 318 may modify electrical characteristics of power output by the first LRU 310 to substantially match power requirements of the second powered devices 326. However, in a particular embodiment, the first powered devices 316 and the second powered devices 326 may have substantially similar power requirements, in which case, no transformer 318 may be used.

Figure 4:
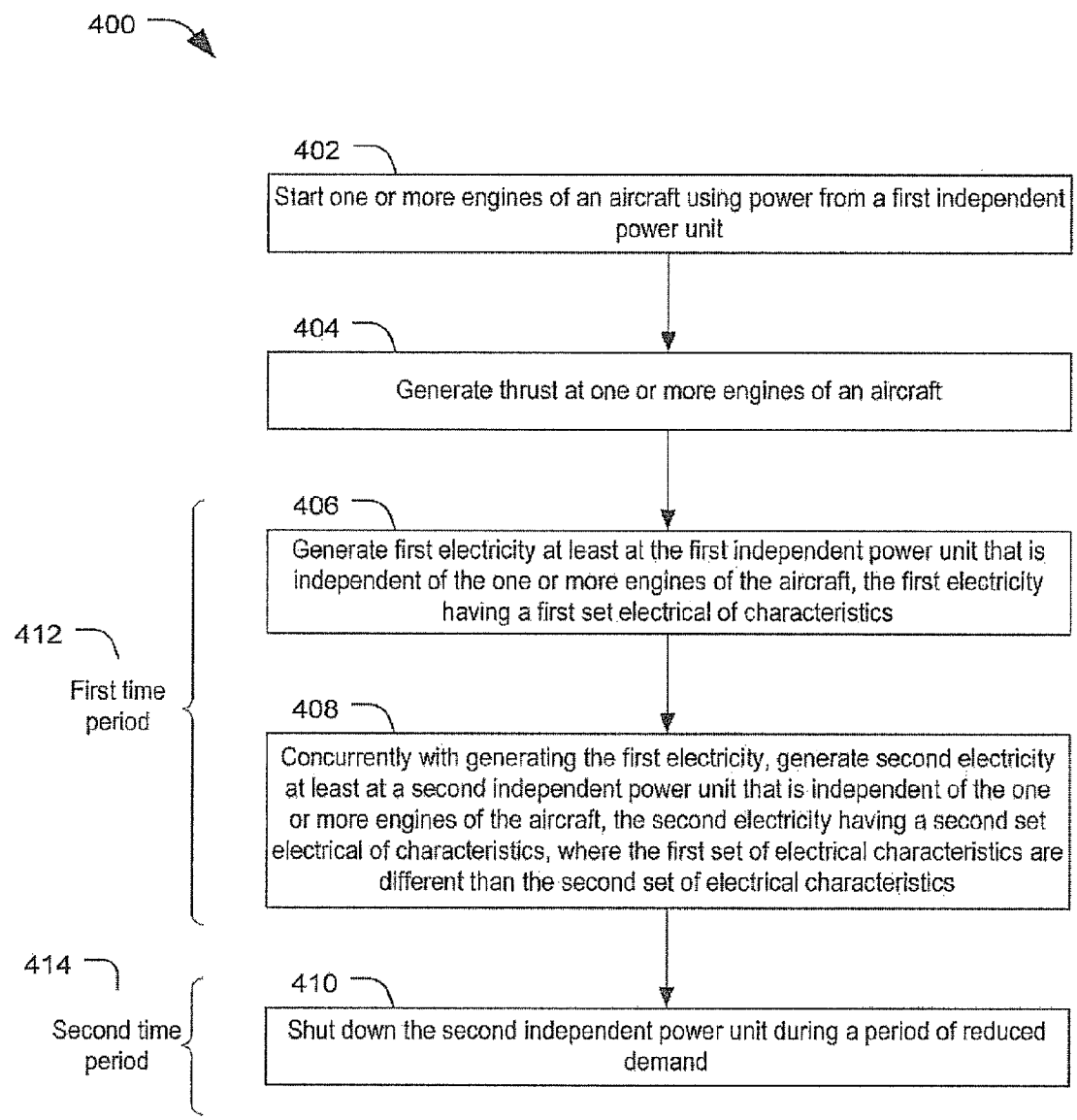
FIG. 4 is a flow chart of a particular embodiment of a method of independently generating power in an aircraft.

FIG. 4 is a flow chart of a particular embodiment of a method of independently generating power in an aircraft, the method generally designated 400. The method 400 may be performed in an aircraft having an aircraft architecture (e.g., the architecture described with reference to FIG. 2), such as the aircraft 300 of FIG. 3. The method 400 may include, at 402, starting the one or more engines of the aircraft using power from a first independent power unit and, at 404, generating thrust at one or more engines of the aircraft. The method 400 also includes, at 406, generating first electricity at the first independent power unit. The first independent power unit may be independent of the one or more engines of the aircraft. For example, the first independent power unit may generate the first electricity without receiving power from the one or more engines. The first electricity has a first set of electrical characteristics.

The method 400 may also include, at 408, generating second electricity at a second independent power unit concurrently with generating the first electricity. The second independent power unit may be independent of the one or more engines of the aircraft. For example, the second independent power unit may generate the second electricity without receiving power from the one or more engines. The second electricity may have a second set of electrical characteristics that are different than the first set of electrical characteristics. The method 400 also includes, at 410, shutting down the second independent power unit. In a particular embodiment, the first and second independent power units generate power concurrently during a first time period 412. For example, the first time period 412 may be a period of high power demand. The second power unit may be shut down during a second time period 414. The second time period 414 may be a period of reduced demand (e.g., relative to the first time period 412). Thus, the power units may be operated in an efficient manner.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, claimed subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    generating thrust at one or more engines of an aircraft;
    generating first electricity at a first power unit that is independent of the one or more engines of the aircraft, the first electricity having a first set of electrical characteristics;
    concurrently with generating the first electricity, generating second electricity at a second power unit that is independent of the one or more engines of the aircraft, the second electricity having a second set of electrical characteristics, wherein the first set of electrical characteristics is different than the second set of electrical characteristics; and
    receiving the first electricity at an environmental control system (ECS) of the aircraft, wherein, during flight, the ECS is electrically and pneumatically isolated from the one or more engines.

2. The method of claim 1, further comprising, before generating thrust at the one or more engines of the aircraft, starting the one or more engines of the aircraft using the first electricity.

3. The method of claim 1, wherein, during flight, the first power unit generates the first electricity independent of the one or more engines of the aircraft.

4. The method of claim 1, wherein, during flight, the second power unit generates the second electricity independent of the one or more engines of the aircraft.

5. The method of claim 1, wherein the first electricity includes direct current and wherein the second electricity includes alternating current.

6. The method of claim 1, wherein the first power unit includes a first generator and wherein the second power unit includes a second generator that is different than the first generator.

7. The method of claim 6, wherein the first power unit generates the first electricity using a first fuel, wherein the second power unit generates the second electricity using a second fuel, wherein the first power unit receives the first fuel from a first fuel source, wherein the second power unit receives the second fuel from a second fuel source that is distinct from the first fuel source, wherein the one or more engines generate the thrust using a third fuel, and wherein the one or more engines receive the third fuel from a third fuel source that is different from the first fuel source and the second fuel source.

8. The method of claim 1, wherein the first power unit includes a fuel cell.

9. The method of claim 1, wherein the second power unit includes a fuel cell.

10. The method of claim 1, wherein the first power unit includes a gas turbine.

11. The method of claim 1, wherein the second power unit includes a gas turbine.

12. The method of claim 1, wherein the first electricity is provided from the first power unit to a first powered system, wherein the second electricity is provided to a second powered system, wherein the first powered system is associated with a first set of power requirements, wherein the second powered system is associated with a second set of power requirements, wherein the first set of power requirements include the first set of electrical characteristics, and wherein the second set of power requirements include the second set of electrical characteristics.

13. The method of claim 1, further comprising:
generating conditioned air at the ECS using the first electricity; and
providing the conditioned air to at least a portion of a fuselage of the aircraft.

14. A system comprising:
at least one engine configured to generate thrust;
a first power unit configured to generate first electricity independent of the at least one engine, wherein the first electricity has a first set of electrical characteristics;
a second power unit configured to generate second electricity independent of the at least one engine, wherein the second electricity has a second set of electrical characteristics that is different than the first set of electrical characteristics; and
an environmental control system (ECS) configured to receive the first electricity from the first power unit, wherein, during operation, the ECS is electrically and pneumatically isolated from the at least one engine.

15. The system of claim 14, wherein the at least one engine is housed in at least one engine nacelle, and wherein no power derived from the at least one engine is routed to operate systems outside the engine nacelle.

16. The system of claim 14, further comprising:
a first powered system having a first set of power requirements; and
a second powered system having a second set of power requirement,
wherein the first set of power requirements corresponds to the first set of electrical characteristics, and wherein the second set of power requirements corresponds to the second set of electrical characteristics.

17. The system of claim 16, further comprising at least one power conversion device configured to generate the second electricity using at least a portion of the first electricity in response to a failure of the second power unit, wherein the second electricity generated by the at least one power conversion device has the second set of electrical characteristics.

18. The system of claim 14, wherein the first power unit generates the first electricity concurrently with the second power unit generating the second electricity.

19. An aircraft comprising:
a fuselage;
one or more wings;
at least one engine configured to generate thrust;
a first power unit configured to generate first electricity independent of the at least one engine, wherein the first electricity has a first set of electrical characteristics;
a second power unit configured to generate second electricity independent of the at least one engine, wherein the second electricity has a second set of electrical characteristics that is different than the first set of electrical characteristics; and
an environmental control system (ECS) configured to receive the first electricity from the first power unit, wherein, during flight, the ECS is electrically and pneumatically isolated from the at least one engine.

20. The aircraft of claim 19, wherein the ECS is further configured to:
generate conditioned air using the first electricity; and
provide the conditioned air to at least a portion of the fuselage.

* * * * *